(12) United States Patent
Napoli

(10) Patent No.: US 6,888,545 B2
(45) Date of Patent: May 3, 2005

(54) RASTERIZATION OF POLYTOPES IN CYLINDRICAL COORDINATES

(75) Inventor: Joshua Napoli, New Smyrna Beach, FL (US)

(73) Assignee: Actuality Systems, Inc., Burlington, MA (US)

(*) Notice: Subject to any disclaimer, the term of this patent is extended or adjusted under 35 U.S.C. 154(b) by 256 days.

(21) Appl. No.: 09/949,303

(22) Filed: Sep. 7, 2001

(65) Prior Publication Data

US 2002/0105518 A1 Aug. 8, 2002

Related U.S. Application Data

(60) Provisional application No. 60/230,972, filed on Sep. 7, 2000.

(51) Int. Cl.[7] .............................................. G06T 17/00
(52) U.S. Cl. ..................................................... 345/424
(58) Field of Search .................................. 345/424; 1/1

(56) References Cited

U.S. PATENT DOCUMENTS

| | | | |
|---|---|---|---|
| 4,371,933 A | 2/1983 | Bresenham et al. | 364/300 |
| 4,648,045 A | 3/1987 | Demetrescu | 364/518 |
| 4,839,828 A | 6/1989 | Elsner et al. | 364/518 |
| 4,983,031 A | 1/1991 | Solomon | |
| 4,987,554 A | 1/1991 | Kaufman | 364/300 |
| 5,148,310 A | 9/1992 | Batchko | |
| 5,574,836 A | 11/1996 | Broemmelsiek | 395/127 |
| 5,877,779 A * | 3/1999 | Goldberg et al. | 345/538 |
| 5,936,767 A | 8/1999 | Favalora | |
| 6,049,317 A | 4/2000 | Thompson et al. | |
| 6,208,318 B1 * | 3/2001 | Anderson et al. | 345/1.1 |

FOREIGN PATENT DOCUMENTS

| | | |
|---|---|---|
| EP | 0312 720 | 4/1989 |
| EP | 0827 129 | 3/1998 |

OTHER PUBLICATIONS

Jack Bresenham, "A Linear Algorithm for Incremental Digital Display of Circular Arcs," Communications of the ACM, vol. 20, No. 2, Feb. 1997.

"Optimized Drawing of Filled and Unfilled Circles in a Two-Dimensional Graphics System", *IBM Technical Disclosure Bulletin*, vol. 33, No. 6B, Nov. 1, 1990, pp. 291–295.

B. Lacotte, "Elimination of Keystone and Crosstalk Effects in Stereoscopic Video", *Rapport Technique De L'Inrs–Telecommunications*, No. 95–31, Dec. 22, 1995, pp. 1–27.

* cited by examiner

*Primary Examiner*—Almis Jankus
(74) *Attorney, Agent, or Firm*—Fish & Richardson P.C.

(57) ABSTRACT

A method for rendering a polytope in a volumetric display includes partitioning the polytope into a plurality of polytope sections, each of the polytope sections being disposed in an active slice defined by an entry plane and an exit plane. The presence of an imaging screen within the active slice is then detected. While the imaging screen is within the active slice, a connecting polygon is defined on the basis of a projection of the polytope section on the entry plane. This connecting polygon is then rendered on the imaging screen.

9 Claims, 4 Drawing Sheets

RASTERIZATION OF POLYTOPES IN CYLINDRICAL COORDINATES

CLAIM OF PRIORITY

Under 35 USC §129(e)(1), this application claims the benefit of the priority date of U.S. Provisional Patent Application Ser. No. 60/230,972, filed on Sep. 7, 2000, the contents of which are herein incorporated by reference.

BACKGROUND

Many computer-implemented displays consist of two-dimensional arrays of individual picture elements, or pixels. To form an image, a rasterizer selectively illuminates these pixels. Because the individual pixels are so small, the display appears, to a human viewer, to be a continuous rendering of an image. This illusion is particularly effective for complex images of continuous tones such as photographs.

For simple geometric shapes, however, the pixelated nature of the display can become apparent to the human viewer. For example, if the rasterizer is instructed to draw a surface, there is no guarantee that the points on that surface will coincide with the pixels that are available for rendering it. As a result, a desired surface is often rendered as a set of pixels that are close to, but not necessarily coincident with, the desired surface. This results in surfaces that have a jagged or echeloned appearance.

A surface is typically formed by combining a large number of small surface elements. Thus, in the course of rendering a surface, a large number of polygonal surface elements are drawn. Because of the ease with which it can be assembled to form surfaces having complex curves, a particularly suitable polygonal surface element is a triangular surface element.

To render a surface element, the rasterizer must frequently select those pixels that will minimize the jagged appearance of the resulting surface element. A straightforward mathematical approach is to use the equations of the lines defining the edges of the surface element and to derive the equation of a plane containing those lines. The rasterizer can then choose pixels whose coordinates minimize a least-square error across all points on the line. While such an approach has the advantage of globally optimizing the selection of pixels on the surface element, the large number of floating-point operations required causes this approach to be prohibitively time-consuming.

To meet constraints on speed, rasterizers typically implement rasterization methods that avoid time-consuming floating-point operations. However, known rasterization methods rely on the assumption that the array of pixels is arranged in a uniform rectangular grid that can readily be modeled by a Cartesian coordinate system. This was a reasonable assumption given the prevalence of two-dimensional displays such as computer monitors and printers at the time such algorithms were developed.

Since then, however, volumetric, or three-dimensional displays have been developed. Such displays permit the generation, absorption, or scattering of visible radiation from a set of localized and specified regions within a volume. Examples of such systems are taught in Hirsch U.S. Pat. No. 2,967,905, Ketchpel U.S. Pat. No. 3,260,424, Tsao U.S. Pat. No. 5,754,267, and on pages 66–67 of Aviation Week, Oct. 31, 1960.

In such displays, the more natural coordinate system is a cylindrical coordinate system. Because of the unusual properties of the cylindrical coordinate system, rasterization methods for Cartesian coordinate systems cannot readily be applied to rasterize surfaces in a cylindrical coordinate system.

SUMMARY

The method of the invention provides for rapid rendering of a polytope in a volumetric display having a rotatable screen. The method includes stepping the rotatable screen through a sequence of angular positions. At each angular position, a rasterized approximation of a polygon is rendered on the screen. The geometry of the polygon is indicative of the projection of a section of the polytope onto the screen.

In one aspect of the invention, the screen is positioned at a first angular position in which the screen is coplanar with an entry plane. First and second pluralities of voxels are then selected on the basis of the geometric relationship between the polytope and the entry plane. In particular, the first plurality of voxels corresponds to an intersection of the polytope with the entry plane; and the second plurality of voxels corresponds to a projection, onto the entry plane, of an intersection of the polytope with an exit plane. A polygon defined by the first and second pluralities of voxels is then rendered on the two-dimensional imaging screen.

Another aspect of the rasterization method includes partitioning the polytope into a plurality of polytope sections, each of which is disposed in an active slice defined by an entry plane and an exit plane. The presence of the imaging screen within an active slice is then detected. Once the imaging screen is in the active slice, a connecting polygon is rendered on the imaging screen. This polygon is derived from the projection of the polytope section on the entry plane.

The polytope can be a figure that is contained in a single plane. The planar figure can be a triangle, or quadrilateral, a circle, a conic section, or any other planar shape.

In some cases, the optical layout of a volumetric display introduces distortions that are corrected by additional, optional steps in the method. For example, the distortion introduced by rotation of the imaging screen can be corrected by generating rotated coordinates corresponding to the first voxel, the rotated coordinates corresponding to rotation about a selected angle. Similarly, correction of distortion resulting from keystoning can be achieved by generating projected coordinates corresponding to the first voxel, the projected coordinates being obtained by correction for keystone distortion.

These and other features and advantages of the invention will be apparent from the following detailed description, and the figures, in which:

DETAILED DESCRIPTION

Figure 1:
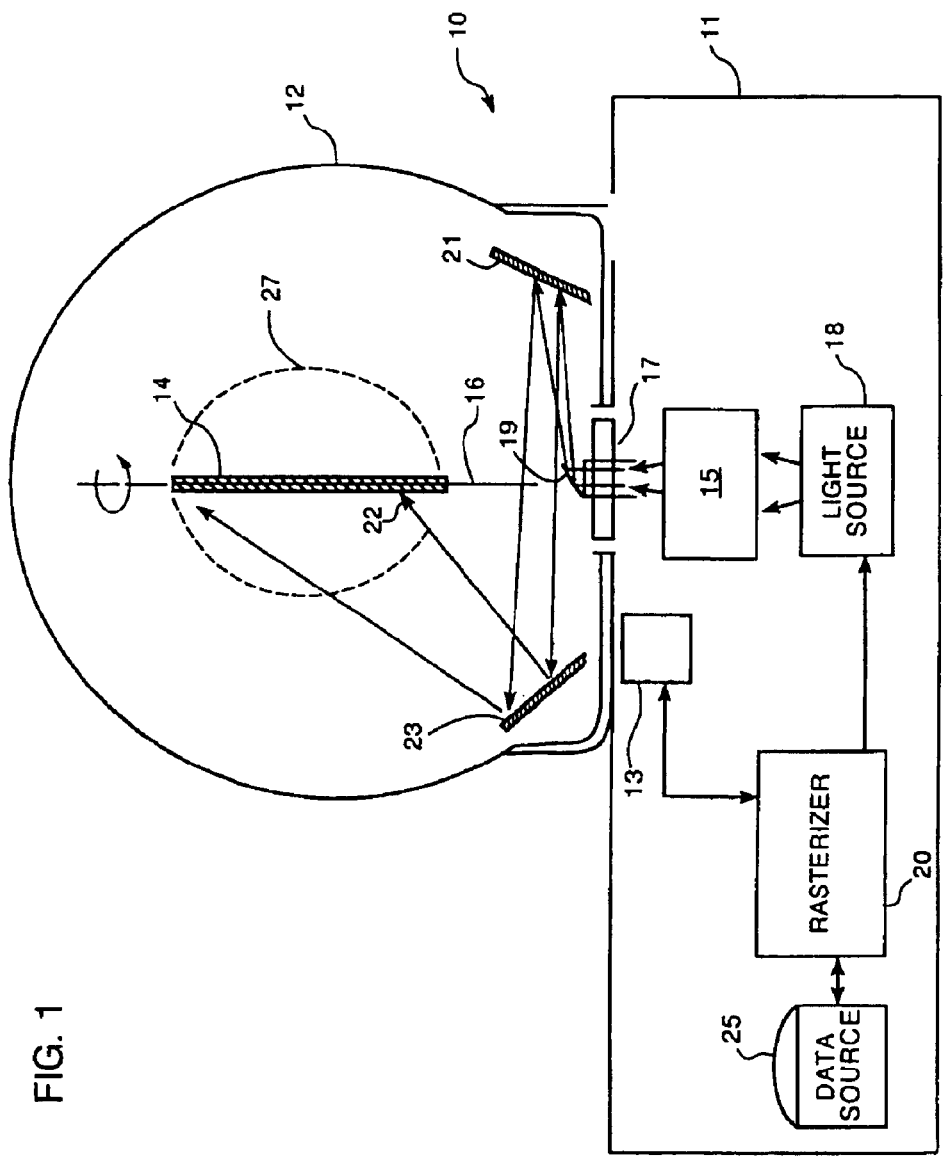
FIG. 1 is a volumetric display.

A volumetric display 10 for practice of the invention, shown in FIG. 1, includes a base section 12 and a rotating section 14. A motor controller 16 causes a motor (not shown) to spin the rotating section 14 rapidly about a spin axis 18 coupled to the base section 12.

Within the base section 12, a light source 20, under the control of a rasterizer 22, generates a spatially varying pattern of light for illuminating selected pixels 24 on a rotatable imaging screen 26 at successive instants. A typical light source 20 includes a micro-mechanical array of individually addressable mirrors whose orientations are under the control of the rasterizer 22. This light is passed into the rotating section 14 through a stationary optical subsystem 25 in optical communication with a rotating optical subsystem 26 coupled to the rotating section 14 and coaxial with the axis 18.

Light from the rotating optical subsystem 26 is projected onto a central mirror 28 disposed above the rotating optical subsytem 26 and angled to direct light toward a first relay mirror 30 disposed at the periphery of the base section 12. The first relay mirror 30 is angled to reflect light to a second relay mirror 32 at the periphery of the base section 12. The second relay mirror 32 is angled to direct light from the first relay mirror 30 toward the imaging screen 26.

The pixels to be illuminated on the imaging screen 26, and the instants at which they are to be illuminated, are determined by the rasterizer 22 on the basis of data indicative of the angular position of the imaging screen 26 (as supplied by the motor controller 16) and data descriptive of a three-dimensional image (as stored in a data source 34).

As the rotating section 14 spins around the axis 18, the imaging screen 26 sweeps out a display volume 36 within the rotating section 14. If the rotating section 14 were to spin rapidly enough, and if the successive instants of illumination were to be separated by sufficiently brief time intervals, a continuous curve would appear to hang in mid-air within the display volume 36.

Figure 2:
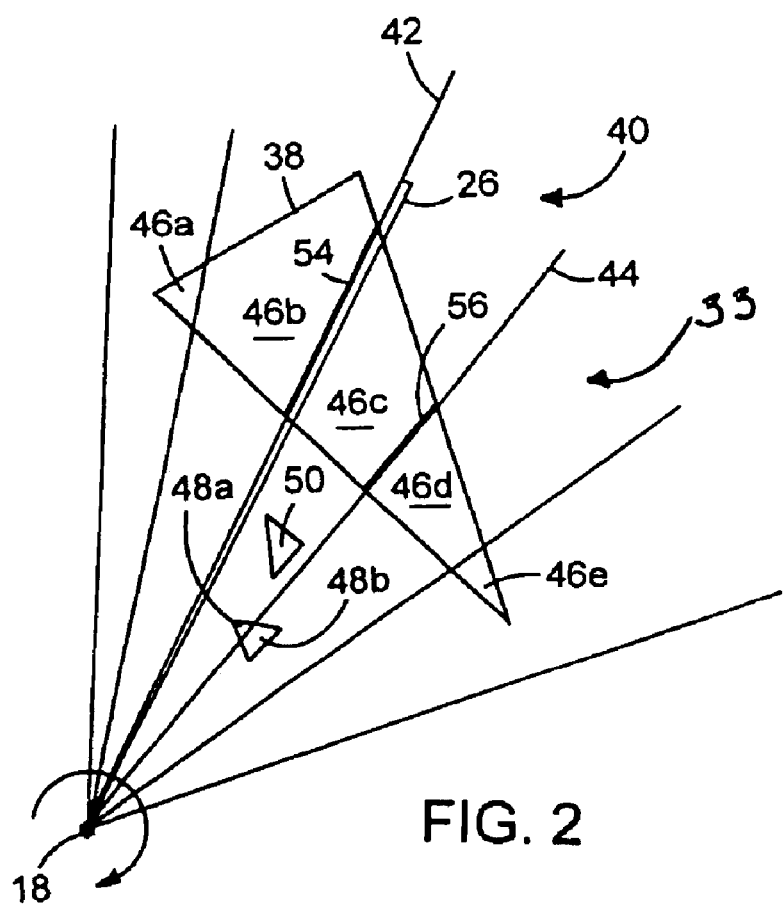
FIG. 2 is a planar view of the display volume.

FIG. 2 illustrates the projection onto a plane perpendicular to the axis 18 of a desired polytope, in this case a triangle 38 to be approximated by the rasterizer 22. The imaging screen 26 torates contnuously about the axis 18, passing through threshold angular positions indicated by the radial lines in FIG. 2. At each of the angular positions, the light source 20, under the control of the rasterizer 22, illuminates selected pixels 24 on the imaging screen 26. As shown in FIG. 2, by illuminating the correct pixels at the correct times, it is possible to trace out a rasterized surface that approximates the desired triangle 38. It is the function of the rasterizer 22 to control the light source 20 so as to trace out the desired triangle 38 in this manner.

In the volumetric display 10 of FIG. 1, the rasterizer 22 causes a sequence of images to be projected onto the imaging screen 26. The particular image displayed on the imaging screen 26 depends on the angular position of the imaging screen 26 as it rotates about its axis 18. The image does not, however, vary continuously with angular position of the screen 26. Instead, the displayed image remains constant for a particular range of angular positions, changing only when the angular position of the screen 26 crosses one of the threshold angles shown in FIG. 2. These threshold angles are typically equally spaced and very close together. In the illustrated embodiment, the angular separation between threshold angles is between 30 minutes and 1 degree of arc.

The display volume 36 of the volumetric display 10 can thus be viewed as a union of wedge-shaped slices 40 that intersect at the spin axis 18. In the cross-sectional view of FIG. 2, each slice 40 is bounded by first and second bounding planes defined by the threshold angles for that slice 40. The two bouding planes are referred to as the "entry plane 42" and the "exit plane 44" for that slice 40. As the screen 26 rotates about the spin axis 18, it becomes momentarily coplanar with the entry plane 42 for a particular slice 40. It then traverses that slice 40, and becomes coplanar with the exit plane 44 for that same slice 40. As is apparent from FIG. 2, the exit plane 44 for an active slice 40 is thus coplanar with the entry plane for a following slice 33. When the imaging screen 26 is coplanar with any entry plane 42, the image displayed on the screen 26 is permitted to change. As the imaging screen 26 traverses an active slice 40, the image displayed on the screen 26 remains constant.

Data generally available to the rasterizer 22 for drawing the desired triangle 38 includes data from which the Cartesian coordinates of the desired triangle's vertices $V_0$, $V_1$, $V_2$ can be obtained. From these vertices, it is possible to derive equations of lines that define the sides $L_1$, $L_2$, $L_3$ of the desired triangle 38. As an example, if $(x_0,y_0,z_0)$ and $(x_1,y_1,z_1)$ are two of the vertices of the triangle 38, the following constants descriptive of a first side $L_0$ of the desired triangle 38 can be calculated:

$$\theta_t = \arctan\left(\frac{y_1 - y_0}{x_1 - x_0}\right)$$

$$d = \frac{|x_0 \cdot y_1 - x_1 \cdot y_0|}{\sqrt{(x_1 - x_0)^2 + (y_1 - y_0)^2}}$$

$$\gamma = \frac{d \cdot (z_1 - z_0)}{\sqrt{(x_1 - x_0)^2 + (y_1 - y_0)^2}}$$

$$h_t = z_0 - \frac{(x_0 \cdot (x_1 - x_0) - y_0 \cdot (y_1 - y_0)) \cdot (z_1 - z_0)}{(x_1 - x_0)^2 + (y_1 - y_0)^2}$$

These constants need only be computed once for each desired triangle 38. In the illustrated embodiment, d is an 18-bit fixed point signed number, $h_t$ is a 40-bit fixed point number, and $\gamma$ is a 18-bit fixed point signed number.

To improve performance, values of $\theta_t$ are obtained from a look-up table. The look-up table is kept as small as possible by selecting a resolution of $\theta_t$ that is coarse, but not so coarse as to significantly degrade the accuracy of the rasterization. In particular, if the resolution of $\theta_t$ is coarser than the $\theta$ resolution of the display space, values of $\theta$ corresponding to different planes can be mapped to the same r and h values. This causes an undesirable loss of resolution in the $\theta$ direction.

In the illustrated embodiment, the number of entries in the look-up table is double the $\theta$ resolution of the display space. This ratio provides sufficient accuracy to eliminate most visual artifacts and to avoid degrading the minimum resolution of the display 10.

Given these constants, the rasterizer 22 then obtains the cylindrical coordinates of the intersections of the desired triangle 38 with each of the exit and entry planes 42, 44, as shown in FIG. 2. These intersections are lien segments having end points given by $$r(\theta) = d \cdot \sec(\theta - \theta_t)$$

$$h(\theta) = h_t + \gamma \cdot \tan(\theta - \theta_t)$$

where $\theta$ is the angle associated with a particular plane.

As is apparent from FIG. 2, a desired triangle 38 generally spans several slices. In such case, the slices divide the triangle 38 into triangle-sections 46a–e. Each slice contains one triangle-section. In most cases, a triangle-section 46c–d does not contain a vertex of the triangle 38. In other cases, a triangle-section 46a–b, 46e, 48a–b contains one or two vertices. In still other cases, a desired triangle 50 is so small that it is contained within one slice. In such a case, the triangle-section 50 (which is also the triangle itself) contains all three vertices.

Figure 3:
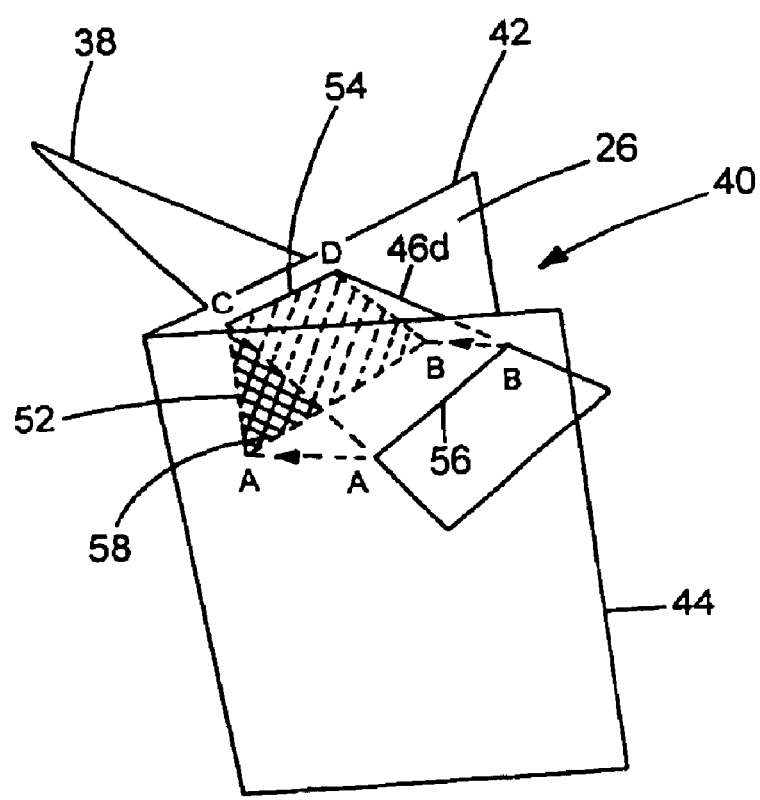
FIG. 3 shows the projection of a triangle onto an entry plane to define a connecting polygon.

Referring to FIG. 3, when the imaging screen 26 becomes coplanar with an entry plane 42 of a slice 40, the rasterizer projects the triangle-section 46d associated with that slice 40 onto the imaging screen 26. This projection results in the formation of a connecting polygon 52 on the imaging screen 26. In most cases, as shown in FIG. 3, the connecting polygon 52 on the imaging screen 26 is a quadrilateral. In some cases, depending on the size and orientation of the triangle 38, the connecting polygon 52 can have as few as three or as many as five sides.

The rasterizer 22 then fills in that connecting polygon 52 using a conventional two-dimensional region filling algorithm. The connecting polygon 52, now filled, remains on the imaging screen 26 as the imaging screen 26 traverses the slice 40. When the imaging screen 26 reaches the exit plane 44 for the slice 40, the rasterizer 22 removes the connecting polygon 52 and replaces it with another connecting polygon 52, formed by projecting the triangle-section associated with the succeeding slice 54. Because the connecting polygon 52 that the rasterizer 22 places on the screen is formed by projection of the triangle-sections onto the entry plane 42, the connecting polygon 52 associated with one-triangle-section merges imperceptibly into the connecting polygon 52 associated with the succeeding triangle-section.

In most cases, as shown in FIGS. 2 and 3, the triangle 38 will intersect both the entry place 42 and the exit plane 44 of a slice 40. Under these circumstances, a first side CD of the connecting polygon 52 is the line segment formed by the intersection of the triangle 38 with the entry place 42. A second side of the connecting polygon 52 is the projection A'B', onto the entry plane 42, of the line segment formed by the intersection AB of the triangle 38 with the exit plane 44. The remaining two sides of the connecting polygon 52 are formed by connecting the first side CD and second side A'B' such that the resulting connecting polygon 52 is convex.

In other cases, the triangle intersects the slice's entry plane 42 but does not intersect the slice's exit plane 44. This typically occurs when one or more vertices of the triangle are within the slice 40. When this is the case, a first side of the connecting polygon 52 is the line segment formed by the intersection of the triangle with the entry plane 42. The remaining sides of the connecting polygon 52 are formed by projecting those vertices of the triangle 38 that are within the slice 40 onto the entry plane 42. The remaining sides are then connected to so as to form a convex connecting polygon 52.

Conversely, the triangle 38 might intersect the slice's exit plane 44 but not its entry plane 42. This can also occur when one or more vertices are within the slice 40. In this case, a first side of the connecting polygon 52 is the projection, onto the entry plane 42, of the intersection of the triangle 38 with the exit plane 44. The remaining sides of the connecting polygon 52 are formed by projecting the vertices onto the entry plane 42 and connecting the first side to the projected vertices so as to form a convex connecting polygon 52.

Finally, a triangle 38 can be completely within a slice 40, in which case the triangle 38 intersects neither the slice's entry plane 42 nor its exit plane 44. In this case, the connecting polygon 52 is the projection of the triangle 38 on the entry plane 42.

For triangle-sections that do not include a vertex of the triangle, the rasterizer 22 determines line segmenents defining the intersections of the triangle 38 with both the entry plane 42 and the exit plane 44 (hereafter referred to as the "entry segment 54" and "exit segment 56" respectively) as described above and illustrated in FIG. 3. When the screen 26 becomes coplanar with the entry plane 42, the rasterizer 22 renders voxels corresponding to the entry segment 54. In addition, the rasterizer 22 determines the projection of the exit segment 56 (hereafter referred to as the "projected exit-segment 58") onto the entry plane 42, as shown in FIG. 3. This defines the connecting polygon 52 on the screen 26. The connecting polygon's sides include the entry segment 54 and the projected exit-segment 58. The rasterizer 22 then renders voxels on the screen 26 that fill this connecting polygon 52. This rasterization is carried out using conventional two-dimensional polygon-filling algorithms.

Figure 4:
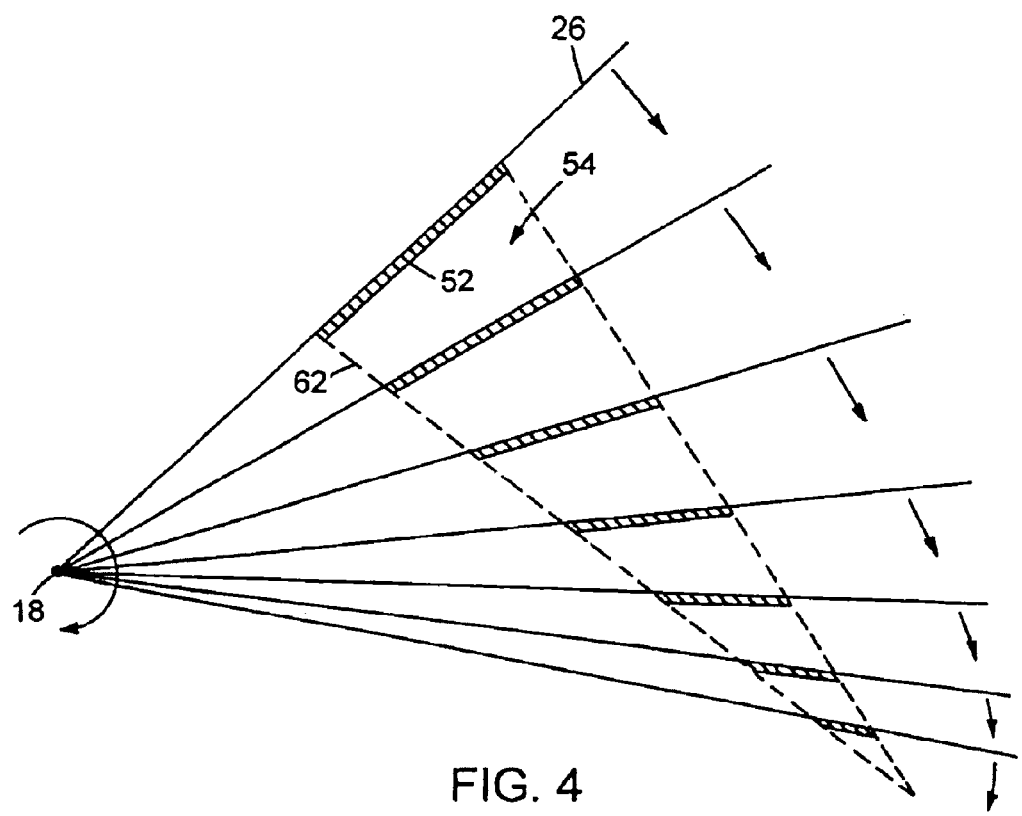
FIG. 4 is a planar view of a set of connecting polygons that together sweep out a triangle.

As the screen 26 traverses the slice 40, the connecting polygon 52 rendered on that screen 26 traces out a prism 62 having a cross-section corresponding to that of the connecting polygon 52, as shown in the transverse cross-section of FIG. 4.

As the screen 26 approaches the exit plane 44, the projected exit-segment 58 approaches the exit segment 56. This exit segment 56 is also the entry segment 54 for the following slice 33.

As a result, the prisms 62 traced out by the succession of connecting polygons 52 appear to merge smoothly into each other, resulting in the display of a triangle in three dimensions.

The rasterization method of the invention thus rasterizes a triangle in a cylindrical coordinate system by rasterizing a sequence of connecting polygons 52 on the imaging screen 26 as that imaging screen 26 sweeps out a cylinder in a three-dimensional volume.

Certain volumetric display devices, such as the one illustrated in FIG. 1, introduce particular image distortions that require correction. By appropriately rotating and projecting the cylindrical coordinate system, the rasterization method corrects for these image distortions.

A first type of image distortion is made apparent when the light source 20 projects a static image on the spinning imaging screen 26. When it does so, the static image will appear to rotate about the center of the imaging screen 26. This type of distortion is referred to as "rotational distortion."

A second type of distortion is made apparent when the light source 20 projects an image of a rectangle on the imaging screen 26. When it does so, the rectangle appears distorted into a keystone. This type of distortion, referred to as "keystone distortion," occurs because the optical path from the bottom of the image on the screen 26 to the focus of the light source 20 is shorter than the optical path from the top of the image to the focus. Consequently, the top portion of the image projected by the light source 20 undergoes greater magnification than the bottom portion of the image.

For display devices that require correction for keystone and rotation distortions, it is desirable to execute an additional step between the calculation of cylindrical coordinates of the entry segment 54 and the projected exit-segment 58 and the rasterization of the connecting polygon 52. The cylindrical coordinates of a point on the entry segment 54 and a point on the projected exit-segment 58 are calculated to have angle, radius and height of $(\theta_1, r_1, h_1)$ and $(\theta_2, r_2, h_2)$ respectively. The keystone distortion is corrected by a projection operation on the vectors $(r_1, h_2)$ and $(r_2, h_2)$ to give vectors $(r_1', h_1')$ and $(r_2', h_2')$. The rotation of the image of the light source 20 on the screen 26 is corrected by an opposite rotation about the center of the screen 26. The vector $(r_1', h_1')$ is rotated by an angle $-\theta_1$, resulting in a vector $(x_1, y_1)$. The vector $(r_2', h_2')$ is rotated by an angle $-\theta_2$, resulting in a vector $(x_2, y_2)$. The vector $(x_1, y_1)$ specifies a point on the light source 20 that must be illuminated to render a corresponding point on the entry segment 54 on the imaging screen 26 at the instant when the rotating section 14 is rotated to an angle $\theta_1$. The vector $(x_2, y_2)$ likewise specifies a point on the light source that must be illuminated to render a corresponding point on the projected exit-segment 58 on the imaging screen 26 at the instant when the rotating section 14 is rotated to an angle $\theta_2$. The connecting polygon 52 is filled on the light source 20 using sides defined by the coordinates $(x_1, y_1)$ and $(x_2, y_2)$. Display designs resulting in optical paths that differ from that shown in FIG. 1 may require one or the other, or none of the foregoing distortion corrections.

While the invention has been described in above in the context of rasterizing a triangular surface in a cylindrical coordinate system, the principles described herein are nevertheless applicable to the rasterization of other two dimensional figures, generally referred to as "polytopes". As used herein, "polytope" means the smallest convex region that includes a set of points; and "edge" means the line segment between two corners, or vertices, of a polytope.

In the more general case of rendering a polytope, an entry segment 54 defines the intersection of the polytope with an entry plane 42 and an exit segment 56 defines the intersection of the polytope with an exit plane 44. The intersection of the polytope with the exit plane 44 is then projected onto the entry plane 42 to form two sides of a connecting polygon 52. The connecting polygon 52 is then rasterized by any of a number of known two-dimensional polygon filling algorithms. This technique applies whether the polytope is a triangle, as described herein, a polygon, a circle, a conic section, or any other two-dimensional polytope.

As the imaging screen 26 spins, each slice 40 that intersects the polytope is made active once. For each active slice 40, the rasterizer 22 defines a polytope-section to be the cylindrical grid points that are both within the active slice 40 and within the polytope. The rasterizer 22 then determines the intersection of the polytope-section with the bounding planes of the active slice 40.

A polytope P is defined by a rectilinear edge-list E in which each edge is indexed and identified by Carterisan coordinates of its two endpoints. To enable changes to this list to be made more efficiently, a list of edge start-points and edge end-points sorted by $\theta$-position is maintained.

The rasterization method is initialized by deriving a cylindrical edge-list E' from the rectilinear edge-list E. The coordinates of the endpoints are then converted from cartesian to cylindrical coordinates and the line constants in the cylindrical coordinate system are calculated. Next, first and second endpoint-lists, $L_b$ and $L_e$ and, are derived. The first endpoint-list $L_b$ is a list of edge leading endpoints, sorted by $\theta$-value. The second endpoint-list $L_e$ is a list of edge trailing endpoints, sorted by $\theta$-value. Each list entry in the first and second endpoint-lists includes the endpoint position and a reference to its respective line.

Additional lists to be initialized include an active edge-list, A, and first and second slice vertex-lists $I_b$ and $I_e$. The active-edge list A will contain references to the cylindrical edge-list E' indicating which edges intersect the active slice 40. The first and second slice vertex-lists $I_b$ and $I_e$ will contain two-dimensional coordinates indicating the position of intersections of edges with the entry and exit planes of a slice 40. In particular, the first slice-vertex-list $I_b$ will contain the intersections of edges with the entry plane 42 of the active slice 40 and the second slice vertex-list $I_e$ will contain the intersections of edges with the exit plane 44 of the active slice 40. First and second pointers $p_b$ and $p_e$ point to the first entries of the first and second endpoint-lists $L_b$ and $L_e$, respectively. These indices keep track of the next endpoints to be encountered.

Following initialization, the rasterization method includes scanning through those slices 40 that intersect the polytope. For each slice 40 between the slice identified by the first entry in first endpoint-list $L_b$ and the slice identified by the last entry in the second endpoint list $L_e$, the rasterizer 22 executes the loop described below.

First, the rasterizer 22 moves the second slice-vertex-list $I_e$ to the first slice-vertex-list $I_b$. This sets the polytope's intersection with the exit plane 44 of the previous slice to be the same as the polytope's intersection with the entry plane 42 of the active slice 40. Then, the rasterizer 22 clears the second slice-vertex-list $I_e$. A new second slice-vertex-list $I_e$ specific to this slice 40 will be calculated subsequently.

While the first pointer $p_b$ points to a vertex in this slice 40, the rasterizer 22 adds that vertex to the first slice-vertex-list $I_b$, adds the edge to the active edge-list A, and advances the first pointer $p_b$. While the second pointer $p_e$ points to a vertex in this slice 40, the rasterizer 22 adds the vertex to the first slice-vertex-list $I_b$, adds the edge to the active edge-list A, and advances the second pointer $p_e$.

For each edge in the active edge-list A, the rasterizer 22 calculates the intersection of that active edge with the exit plane 44 of the slice 40. This intersection is then added to the second slice-vertex-list $I_e$.

Finally, when the first and second slice-vertex-lists $I_b$ and $I_e$ are filled, the rasterizer 22 draws, on the imaging screen 26, the convex hull of the union of the points in the first and second slice vertex-lists $I_b$ and $I_e$. The rasterizer 22 then and fills the interior of the convex hull.

The source code in the attached appendix teaches a particular implementation of the foregoing rasterization method for triangles. In the source code, the variable "x" is a vector and variables beginning with "q" are angles. The functions, procedures, data structures, and other software entities whose meanings are not immediately apparent are defined as follows:

| | |
|---|---|
| int | a type specifier that indicates 32-bit integer. |
| long40 | a type specifier that indicates a 40-bit integer. |
| ang_slice_inc (q) | returns the angle of the slice following q. |
| slice_number (q) | returns the slice number of an angle q. |
| jline_pos ( ... ) | calculates a cylindrical position on a line given an angle and cylindrical line constants. |
| cyln2helios (q, x) | converts a cylindrical point into a physical location by correcting for keystoning and rotational distortions. |
| _he_poly5 ( ... ) | draws a 5-sided polygon in the specified slice |
| _he_poly4 ( ... ) | draws a 4-sided polygon in the specified slice |
| _he_poly3 ( ... ) | draws a 3-sided polygon in the specified slice |
| packet_triangle | a data structure that encodes information about a triangle. Its members are: t0, r0, h0 = coordinates of vertex 0 t1, r1, h1 = coordinates of vertex 1 t2, r2, h2 = coordinates of vertex 2 L0, L1, L2 = cylindrical line constants, where L0 is the line from vertex 0 to vertex 2. L1 is the line from vertex 0 to vertex 1. L2 is the line from vertex 1 to vertex 2. |
| packet_line_k_decode ( ... ) | decodes cylindrical line constants from the above packet_triangle structure. |

The following source code makes reference to a projected coordinate system. The projected coordinate system is related to the cylindrical coordinate system described above through tumbling and keystoning operations. These operations are shown as italicized text in the following source code.

Having described the invention, and a preferred embodiment thereof, what is claimed as new and secured by letters patent is:

APPENDIX

```
/* Draw the region between L0 and L1, not including the slice containing q_end.
   x0, x1 are the coordinates of the slice prior to q */
void jtriangle_sub (
        int q,      int d_gamma0, int phi_gs0, long40 h_t0,
        int q_end,  int d_gamma1, int phi_gs1, long40 h_t1 )
{
    int x0,   x1;
    int x0_,  x1_;
    if ( q_end==q )
        return;
    x0_ = jline_pos (q, d_gamma0, phi_gs0, h_t0);
    x1_ = jline_pos (q, d_gamma1, phi_gs1, h_t1);
    q = ang_slice_inc (q);
    while ( q != q_end ) {
        /* intersection of edges with leading edge of slice */
        x0 = x0_; /* same as trailing edge intersections from previous slice */
        x1 = x1_;
        /* intersection of edges with trailing edge of slice */
        x0_ = jline_pos (q, d_gamma0, phi_gs0, h_t0);
        x1_ = jline_pos (q, d_gamma1, phi_gs1, h_t1);
        _he_poly4 ( q, 7, x0, x1, x0_, x1_ );
        q = ang_slice_inc (q);
    }
}
/* Draw the region between L0 and L1, starting from L1->end0, going until L1->end1.
   The slice containing L1->end1 is drawn. */
void jtriangle_general_region (
        int q0, int d_gamma0, int phi_gs0, long40 h_t0,
        int q1, int d_gamma1, int phi_gs1, long40 h_t1 )
{
    int q_begin, q_end;
    /* Draw front scan */
    q0 |= 3; /* Always calculate trailing edge of slice */
    q1 |= 3;
    q_begin = q0;
    q_end = q1;
    jtriangle_sub (q_begin, d_gamma0, phi_gs0, h_t0,
                   q_end,   d_gamma1, phi_gs1, h_t1);
    /* Draw back scan */
    q_begin = ang_fixup ( q_begin + TRIG_PI );
    q_end = ang_fixup ( q_end + TRIG_PI );
    jtriangle_sub (q_begin, d_gamma0, phi_gs0, h_t0,
                   q_end,   d_gamma1, phi_gs1, h_t1);
}
void jtriangle_general_1_sub ( int q, const struct packet_triangle * t )
{
    int x [3];
    int d_gamma [2], phi_gs [2];
    long40 h_t [2];
    int Q;
    int T;
    q |= 3;
    Q = slice_number (q);
    packet_line_k_decode (d_gamma [0], phi_gs [0], h_t [0], t->L0);
    packet_line_k_decode (d_gamma [1], phi_gs [1], h_t [1], t->L1);
    x [0] = cyln2helios (q, (t->r0&0xffff) | (t->h0<<l6));
    /* intersection of leading edge of slice and minor edge L1 */
    T = slice_number (t->t1);
    if( Q != T )
        x [1] = jline_pos (q|3, d_gamma [1], phi_gs [1], h_t [1]);
    else /* L1 ends in Q */
        x [1] = cyln2helios (q, (t->r1&0xffff) | (t->h1<<l6));
    /* intersection of leading edge of slice and minor edge L0 */
    T = slice_number (t->t2);
    if( Q != T )
        x [2] = jline_pos (q|3, d_gamma [0], phi_gs [0], h_t [0]);
    else /* L0 ends in Q */
        x [2] = cyln2helios (q, (t->r2&0xffff) | (t->h2<<l6));
    _he_poly3 (q, 7, x [0], x [1], x [2]);
}
void jtriangle_general_5_sub ( int q, const struct packet_triangle * t )
{
    int x [3];
    int d_gamma0, phi_gs0;
```

APPENDIX-continued

```
        long40 h_t0;
        int d_gamma2, phi_gs2;
        long40 h_t2;
        int q_;
        int Q, Q_;
        int T;
        q       |= 3; /* Always calculate trailing edge of slice */
        q_      = ang_scan_dec (q);
        Q       = slice_number (q);
        Q_      = slice_number (q_);
        packet_line_k_decode (d_gamma0, phi_gs0, h_t0, t->L0);
        packet_line_k_decode (d_gamma2, phi_gs2, h_t2, t->l2);
        /* intersection of slice and minor edge l2 */
        T = slice_number (t->t1);
        if ( T != Q )
            x [0] = jline_pos (q_, d_gamma2, phi_gs2, h_t2);
        else /* l2 begins in Q */
            x [0] = cyln2helios (q, (t->r1&0xffff) | (t->h1<<l6));
        /* intersection of slice and major edge L0 */
        T = slice_number (t->t0);
        if ( T != Q )
            x [1] = jline_pos (q_, d_gamma0, phi_gs0, h_t0);
        else /* L0 begins in Q */
            x [1] = cyln2helios (q, (t->r0&0xffff) | (t->h0<<l6));
        /* (r2, h2) corner of triangle */
        x [2] = cyln2helios (q, (t->r2&0xffff) | (t->h2<<l6));
        _he_poly3 (q, 7, x [0], x [1], x[2]);
}
/* First slice: 3-sided */
void jtriangle_general_1 ( const struct packet_triangle * t )
{
        int q;
        /* Front scan */
        q = t->t0;
        jtriangle_general_1_sub ( q, t );
        /* Back scan */
        q = ang_fixup (+TRIG_PI);
        jtriangle_general_1_sub ( q, t );
}
/* General slices: 4-sided; draw the region between L0 and L1 */
void jtriangle_general_2 ( const struct packet_triangle * t )
{
        int     d_gamma0, d_gamma1;
        int     phi_gs0, phi_gs1;
        long40  h_t0, h_t1;
        packet_line_k_decode (d_gamma0, phi_gs0, h_t0, t->L0);
        packet_line_k_decode (d_gamma1, phi_gs1, h_t1, t->L1);
        jtriangle_general_region ( t->t0, d_gamma0, phi_gs0, h_t0,
                        t->t1, d_gamma1, phi_gs1, h_t1 );
}
/* Middle slice: 5-sided */
void jtriangle_general_3 ( const struct packet_triangle * t )
{
        int d_gamma [3], phi_gs [3];
        long40 h_t [3];
        int q,   Q;
        int q_l, Q_l;
        int q_r, Q_r;
        int xx;
        int T0 = slice_number (t->t0);
        int T2 = slice_number (t->t2);
        packet_line_k_decode (d_gamma [0], phi_gs [0], h_t [0], t->L0);
        packet_line_k_decode (d_gamma [1], phi_gs [1], h_t [1], t->L1);
        packet_line_k_decode (d_gamma [2], phi_gs [2], h_t [2], t->l2);
        xx = (t->r1&0xffff) | (t->h1<<l6);
        q       = t->t1;
        q_l     = ang_fixup (t->t1-4);
        q_r     = ang_fixup (t->t1+4);
        Q       = slice_number (q);
        Q_l     = slice_number (q_l);
        Q_r     = slice_number (q_r);
        if ( Q_l !=T0 && Q !=T0 && Q_r !=T2 && Q !=T2 ) {
            int x [5];
            /* Draw front scan */
            x [0] = jline_pos (q_l, d_gamma [0], phi_gs [0], h_t [0]);
            x [1] = jline_pos (q_l, d_gamma [1], phi_gs [1], h_t [1]);
            x [2] = cyln2helios (q, xx);
            x [3] = jline_pos (q_r, d_gamma [2], phi_gs [2], h_t [2]);
            x [4] = jline_pos (q_r, d_gamma [0], phi_gs [0], h_t [0]);
```

APPENDIX-continued

```
        _he_poly5 ( q, 7, x [0], x [1], x [2], x [3], x [4] );
     /* Draw back scan */
        q      = ang_fixup (q+TRIG_PI);
        q_l    = ang_fixup (q_l+TRIG_PI);
        q_r    = ang_fixup (q_r+TRIG_PI);
        x [0] = jline_pos (q_l, d_gamma [0], phi_gs [0], h_t [0]);
        x [1] = jline_pos (q_l, d_gamma [1], phi_gs [1], h_t [1]);
        x [2] = cyln2helios (q, xx);
        x [3] = jline_pos (q_r, d_gamma [2], phi_gs [2], h_t [2]);
        x [4] = jline_pos (q_r, d_gamma [0], phi_gs [0], h_t [0]);
        _he_poly5 ( q, 7, x [0], x [1], x [2], x [3], x [4] );
     } /* otherwise either jtriangle_general_1 or jtriangle_general_5 will handle this slice */
}
/* General slices: 4-sided */
void jtriangle_general_4 ( const struct packet_triangle * t )
{
     unsigned int d_gamma0, d_gamma1;
     unsigned int phi_gs0, phi_gs1;
     long40       h_t0, h_t1;
     packet_line_k_decode (d_gamma0, phi_gs0, h_t0, t->L0);
     packet_line_k_decode (d_gamma1, phi_gs1, h_t1, t->l2);
     jtriangle_general_region ( t->t1, d_gamma0, phi_gs0, h_t0,
                                t->t2, d_gamma1, phi_gs1, h_t1 );
}
/* Final slice: 3-sided */
void jtriangle_general_5 ( const struct packet_triangle * t )
{
     int q;
     /* Front scan */
     q = t->t2;
     jtriangle_general_5_sub (q, t);
     /* Back scan */
     q = ang_fixup (q+TRIG_PI);
     jtriangle_general_5_sub (q, t);
}
void jtriangle_general ( const struct packet_triangle * t )
{
     jtriangle_general_1 (t);
     jtriangle_general_2 (t);
     jtriangle_general_3 (t);
     jtriangle_general_4 (t);
     jtriangle_general_5 (t);
{
```

What is claimed is:

1. A method for rendering a polytope in a volumetric display, said method comprising:

partitioning said polytope into a plurality of polytope sections, each of said polytope sections being disposed in an active slice defined by an entry plane and an exit plane;

in response to determining that an imaging screen is within said active slice, defining, for each point in said active slice, a corresponding point on said entry plane, determining when an imaging screen is within said active slice;

defining, for each point in said active slice, a corresponding point on said entry plane, and rendering each of said corresponding points on said imaging screen.

2. The method of claim 1, wherein determining when an imaging screen is within said active slice comprises determining when said imaging screen is coplanar with said entry plane.

3. The method of claim 1, wherein determining when an imaging screen is within said active slice comprises determining when said imaging screen is coplanar with said exit plane.

4. The method of claim 1, further comprising selecting said polytope to be a planar figure.

5. The method of claim 4, wherein selecting said polytope to be planar figure comprises selecting said polytope to be a triangle.

6. The method of claim 1, further comprising applying a transformation to correct for keystoning.

7. The method of claim 1, further comprising applying a transformation to correct for rotational distortion.

8. A method for rendering, on a volumetric display, a rasterized polytope that approximates a desired polytope, said method comprising:

positioning a screen at a first angular position in which said screen is coplanar with an entry plane;

selecting a first plurality of points on said imaging screen, said first plurality of points corresponding to an intersection of said desired polytope with said entry plane;

selecting a second plurality of points on said imaging screen, said second plurality of points corresponding to a projection, onto said entry plane, of an intersection of said desired polytope with an exit plane;

defining a polygon on said entry plane, said polygon having a boundary that includes said first and second pluralities of points; and rendering selected points on said imaging screen to fill said polygon.

9. A method for rendering a polytope in a volumetric display, said method comprising:

defining a first set of points within said polytope, each of said points in laid first set of points having coordinates that place that point between a first plane associated with a first circumferential angle and a second plane associated with a second circumferential angle;

in response to a determination that an imaging screen has reached a selected circumferential angle, defining a second set of points on said imaging screen, each point in said second set of points corresponding to a point within said first set of points; and during an interval in which said selected circumferential angle is between said first and second circumferential angles, causing said imaging screen to be illuminated at each of said points in said second set of points.

* * * * *